United States Patent
Ishikawa et al.

(10) Patent No.: US 12,159,401 B2
(45) Date of Patent: Dec. 3, 2024

(54) ESTIMATOR LEARNING DEVICE, ESTIMATOR LEARNING METHOD, AND ESTIMATOR LEARNING PROGRAM

(71) Applicant: SAITAMA MEDICAL UNIVERSITY, Saitama (JP)

(72) Inventors: Masahiro Ishikawa, Saitama (JP); Naoki Kobayashi, Saitama (JP); Chisato Okamoto, Saitama (JP); Masayo Kuroda, Saitama (JP); Hidekazu Kayano, Saitama (JP); Makoto Hashizume, Fukuoka (JP); Kenoki Ohuchida, Fukuoka (JP); Chika Iwamoto, Fukuoka (JP)

(73) Assignee: SAITAMA MEDICAL UNIVERSITY, Saitama (JP)

( * ) Notice: Subject to any disclaimer, the term of this patent is extended or adjusted under 35 U.S.C. 154(b) by 328 days.

(21) Appl. No.: 17/629,570

(22) PCT Filed: Jul. 22, 2020

(86) PCT No.: PCT/JP2020/028497
§ 371 (c)(1),
(2) Date: Jan. 24, 2022

(87) PCT Pub. No.: WO2021/015249
PCT Pub. Date: Jan. 28, 2021

(65) Prior Publication Data
US 2022/0270245 A1     Aug. 25, 2022

(30) Foreign Application Priority Data
Jul. 24, 2019   (JP) ................................ 2019-136420

(51) Int. Cl.
*G06T 7/00*     (2017.01)
*G01N 21/17*    (2006.01)

(52) U.S. Cl.
CPC ........... *G06T 7/0012* (2013.01); *G01N 21/17* (2013.01); *G01N 2021/1776* (2013.01); *G06T 2207/20081* (2013.01); *G06T 2207/30024* (2013.01)

(58) Field of Classification Search
CPC ...................... G06T 2207/30024; G01N 21/17
See application file for complete search history.

(56) References Cited

U.S. PATENT DOCUMENTS 5,995,645 A * 11/1999 Soenksen ............... G06V 10/88
                                                          436/63
2009/0274351 A1 * 11/2009 Otsuka ................... G06V 10/56
                                                          382/128
(Continued)

FOREIGN PATENT DOCUMENTS

JP       2011-181015        9/2011
JP       2012-1546278       8/2012
(Continued)

OTHER PUBLICATIONS

International Search Report issued Oct. 20, 2020 in International (PCT) Application No. PCT/JP2020/028497.
(Continued)

*Primary Examiner* — Wen W Huang
(74) *Attorney, Agent, or Firm* — Wenderoth, Lind & Ponack, L.L.P.

(57) ABSTRACT

The estimator learning device contains an image acquisition unit that acquires stained images provided by photographing respectively in a plurality of wavebands a biomaterial sample that has been stained with a prescribed staining solution; a cell nucleus extraction unit that extracts a cell nucleus region present in the biomaterial sample in each of the stained images; a color information acquisition unit that calculates, for each of the stained images, an absorbance in each of the wavebands in the cell nucleus region; and an
(Continued)

estimator learning unit that, based on a relationship between the absorbance in each of the wavebands and information associated with the biomaterial sample and relating to whether the cell nucleus present in the biomaterial sample is in a prescribed state, trains an estimator that estimates whether the cell nucleus is in the prescribed state from the absorbance in each of the wavebands.

7 Claims, 8 Drawing Sheets

(56) References Cited

U.S. PATENT DOCUMENTS

| | | | |
|---|---|---|---|
| 2010/0075373 A1* | 3/2010 | Hoyt | G01N 1/31 |
| | | | 435/40.5 |
| 2011/0182490 A1* | 7/2011 | Hoyt | G06V 20/698 |
| | | | 382/128 |
| 2012/0082362 A1 | 4/2012 | Diem et al. | |
| 2012/0327211 A1 | 12/2012 | Yamamoto | |
| 2013/0265406 A1 | 10/2013 | Mitsui | |
| 2014/0267672 A1* | 9/2014 | Morrison | G01N 21/6458 |
| | | | 348/79 |
| 2014/0355824 A1 | 12/2014 | Iwasaki | |
| 2018/0232883 A1* | 8/2018 | Sethi | G16H 30/40 |
| 2019/0072484 A1 | 3/2019 | Sogawa et al. | |
| 2021/0072219 A1* | 3/2021 | Nakaya | G06T 7/0012 |

FOREIGN PATENT DOCUMENTS

| | | |
|---|---|---|
| JP | 2013-113818 | 6/2013 |
| JP | 2015-7619 | 1/2015 |
| JP | 2016-28250 | 2/2016 |
| JP | 2017-203637 | 11/2017 |
| JP | 6392476 | 9/2018 |
| WO | 2017/195772 | 11/2017 |

OTHER PUBLICATIONS

Ortega, Samuel et al., "Detecting brain tumor in pathological slides using hyperspectral imaging", Biomedical Optics Express 818, Feb. 2018, vol. 9, No. 2, 14 pages.

* cited by examiner

ESTIMATOR LEARNING DEVICE, ESTIMATOR LEARNING METHOD, AND ESTIMATOR LEARNING PROGRAM

TECHNICAL FIELD

The present invention relates to an estimator learning device, an estimator learning method, and an estimator learning program.

BACKGROUND ART

Diagnostic pathology is performed clinically as a definitive diagnostic method, e.g., for cancer grade diagnosis, for determination of the course of medical treatment, and so forth. Investigations are underway in this sphere into the application of hyperspectral (HS) cameras to pathology specimens as a new method for providing information in diagnostic pathology.

CITATION LIST

Patent Literature

[PTL 1] Japanese Patent No. 6392476
[PTL 2] Japanese Patent Application Laid-open No. 2017-203637
[PTL 3] Japanese Patent Application Laid-open No. 2011-181015
[PTL 4] Japanese Patent Application Laid-open No. 2013-113818

Non Patent Literature

[NPL 1] Detecting brain tumor in pathological slides using hyperspectral imaging, Samuel Ortega, Himar Febelo, Rafael Camacho, Maria de la Luz Plaza, Gustavo M. Callico, Reberto Samiento, Biomedical Opt Express. 2018 Feb. 1; 9(2): 818-831.

SUMMARY OF INVENTION

Technical Problem

The cells and tissue specimens used in, e.g., diagnostic pathology, are frequently colorless and transparent and thus may be difficult to observe. In order to facilitate microscopic observation, staining is preliminarily carried out on the cells or tissue before observation.

Stained images in a plurality of bands are obtained by photographing stained cells using a hyperspectral camera. The estimation of the presence/absence of cancer using stained images in a plurality of bands is desirable.

An object of the present invention is to provide art that enables the estimation of whether a cell nucleus in a stained image resides in a prescribed state.

Solution to Problem

The following means are used to solve the aforementioned problem.

Thus, a first aspect is an estimator learning device that is provided with an image acquisition unit that acquires stained images provided by photographing respectively in a plurality of wavebands, a biomaterial sample that has been stained with a prescribed staining solution; a cell nucleus extraction unit that extracts a cell nucleus region present in the biomaterial sample in each of the stained images; a color information acquisition unit that calculates, for each of the stained images, an absorbance in each of the wavebands in the cell nucleus region; and an estimator learning unit that, based on a relationship between the absorbance in each of the wavebands and information associated with the biomaterial sample and relating to whether the cell nucleus present in the biomaterial sample is in a prescribed state, trains an estimator that estimates whether the cell nucleus is in the prescribed state from the absorbance in each of the wavebands.

The disclosed aspect may be implemented by the execution of a program by an information processing device. That is, the disclosed constitution can be established in the form of a program for causing the execution, with an information processing device, of processes of executing each means in the aforementioned aspect, or can be established in the form of a computer-readable recording medium that records the program. In addition, the disclosed constitution may be established by a method in which an information processing device executes processes of executing the aforementioned means. The disclosed constitution may be established in the form of a system that contains an information processing device that carries out processes of executing each of the aforementioned means.

Advantageous Effects of Invention

The present invention can thus provide art that enables the estimation of whether a cell nucleus in a stained image resides in a prescribed state.

DESCRIPTION OF EMBODIMENTS

Embodiments are described in the following with reference to the figures. The configurations in the embodiments are provided as examples, and the construction of the present invention is not limited to or by the specific configurations in the disclosed embodiments. The specific configurations in the embodiments may be adopted as appropriate to carry out the invention.

Embodiment 1

Configuration Example 1

Figure 1:
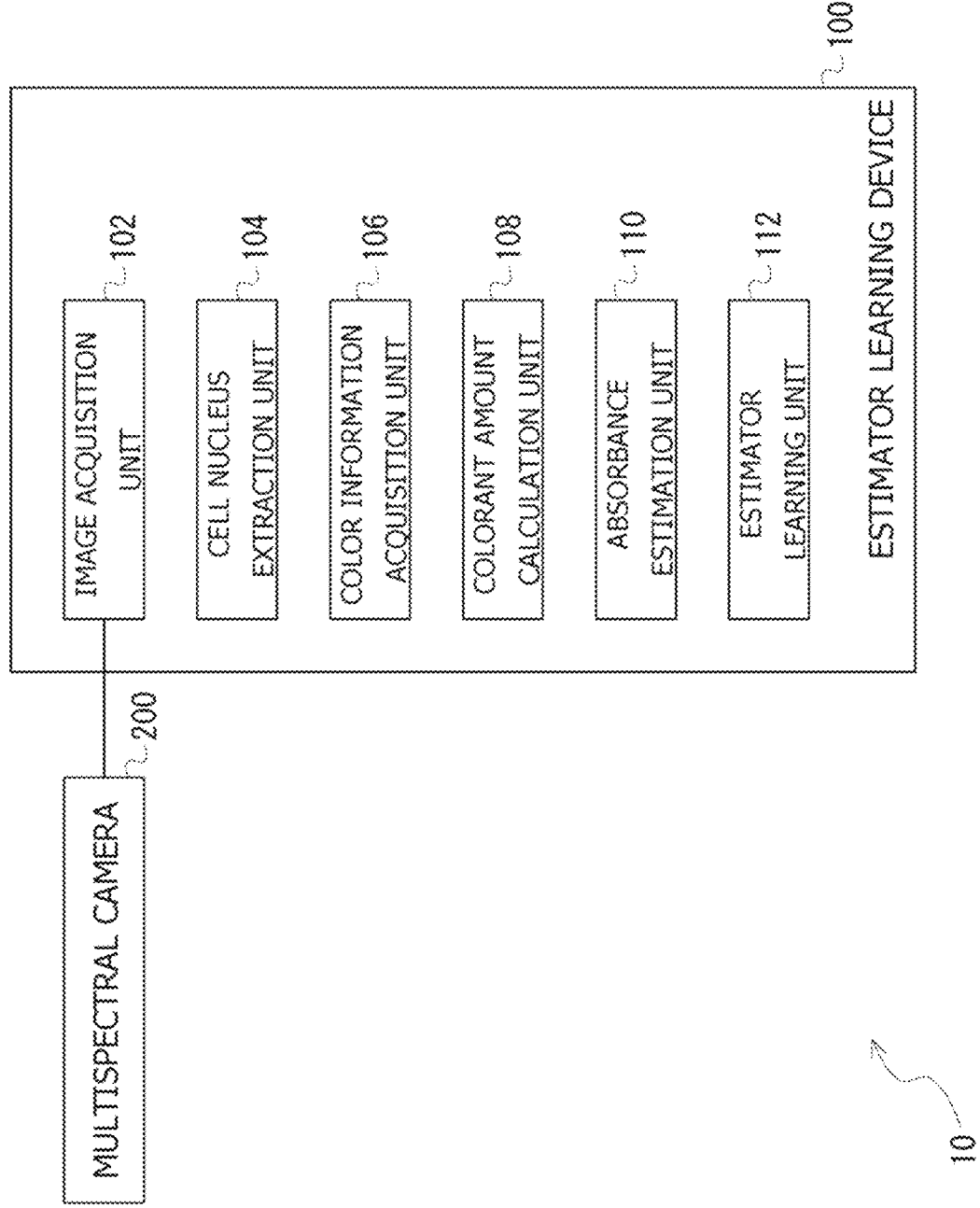
FIG. 1 is a diagram that shows an example of the configuration of an estimator learning system according to an embodiment.

FIG. 1 is a diagram that shows an example of the configuration of an estimator learning system according to the present embodiment. The estimator learning system 10 according to the present embodiment contains an estimator learning device 100 and a hyperspectral camera 200. The estimator learning device 100 contains an image acquisition unit 102, a cell nucleus extraction unit 104, a color information acquisition unit 106, a colorant amount calculation unit 108, an absorbance estimation unit 110, and an estimator learning unit 112. The estimator learning device 100 and the hyperspectral camera 200 are communicably connected either directly or through, for example, a network.

The estimator learning device 100 acquires, from the hyperspectral camera 200, stained images of the sample in each band. The estimator learning device 100 extracts cell nucleus regions from the stained image, calculates the absorbance of the cell nuclei, and estimates the amount of colorant. The estimator learning device 100 estimates the absorbance from the estimated amount of colorant and the spectral absorption coefficient. A cancer estimator is produced by the estimator learning device 100 based on the absorbance and estimated amount of colorant deriving from the stained image and based on information on whether the cell nuclei are cancerous or noncancerous. The sample is, for example, a biomaterial sample such as cells, tissue, and so forth. Cell nuclei other than the cancerous nuclei are noncancerous cell nuclei. The programs, data, tables, and so forth used by the estimator learning device 100 are stored on a storage means for the estimator learning device 100.

The image acquisition unit 102 acquires stained images of the sample from the hyperspectral camera 200.

The cell nucleus extraction unit 104, operating on the stained sample images acquired by the image acquisition unit 102, extracts the cell nucleus regions in a stained image by selection of the cell nucleus regions by, for example, a user. The cell nucleus extraction unit 104 may extract the cell nucleus regions in a stained image on the basis of image recognition.

The color information acquisition unit 106 calculates color information (the absorbance for each band) from the cell nucleus regions of a stained sample image.

The colorant amount calculation unit 108 calculates the amount of colorant from the color information for the cell nucleus regions of the acquired multiband stained images.

The absorbance estimation unit 110 estimates the absorbance based on the spectral absorption coefficient and the amount of colorant calculated by the colorant amount calculation unit 108.

The estimator learning unit 112 trains a cancer estimator based on the absorbance of the cell nuclei in the stained images and the absorbance estimated by the absorbance estimation unit 110 and based on information for whether the cell nuclei are cancerous or noncancerous. The estimator learning unit 112 stores the trained cancer estimator on a storage means. A cancer estimator is an example of the estimator. Whether a cell nucleus is cancerous or noncancerous is an example of whether a cell nucleus is in a prescribed state. Whether a prescribed state is present corresponds to, for example, whether a particular disease is present.

The hyperspectral camera 200 is a camera that can photograph an imaging target in each band (frequency band, waveband) as provided by division into a plurality. The hyperspectral camera 200 photographs the stained sample in each band. The frequency (wavelength) for the imaging target with the hyperspectral camera 200 is, for example, from the infrared region to the ultraviolet region. The hyperspectral camera 200 can carry out photography, for example, in at least 10 wavebands (bands). The hyperspectral camera 200 can carry out photography in more wavebands than an RGB camera. The number of wavebands (bands) photographed by the hyperspectral camera 200 is preferably at least 17. The number of wavebands (bands) photographed by the hyperspectral camera 200 is more preferably at least 51.

Figure 2:
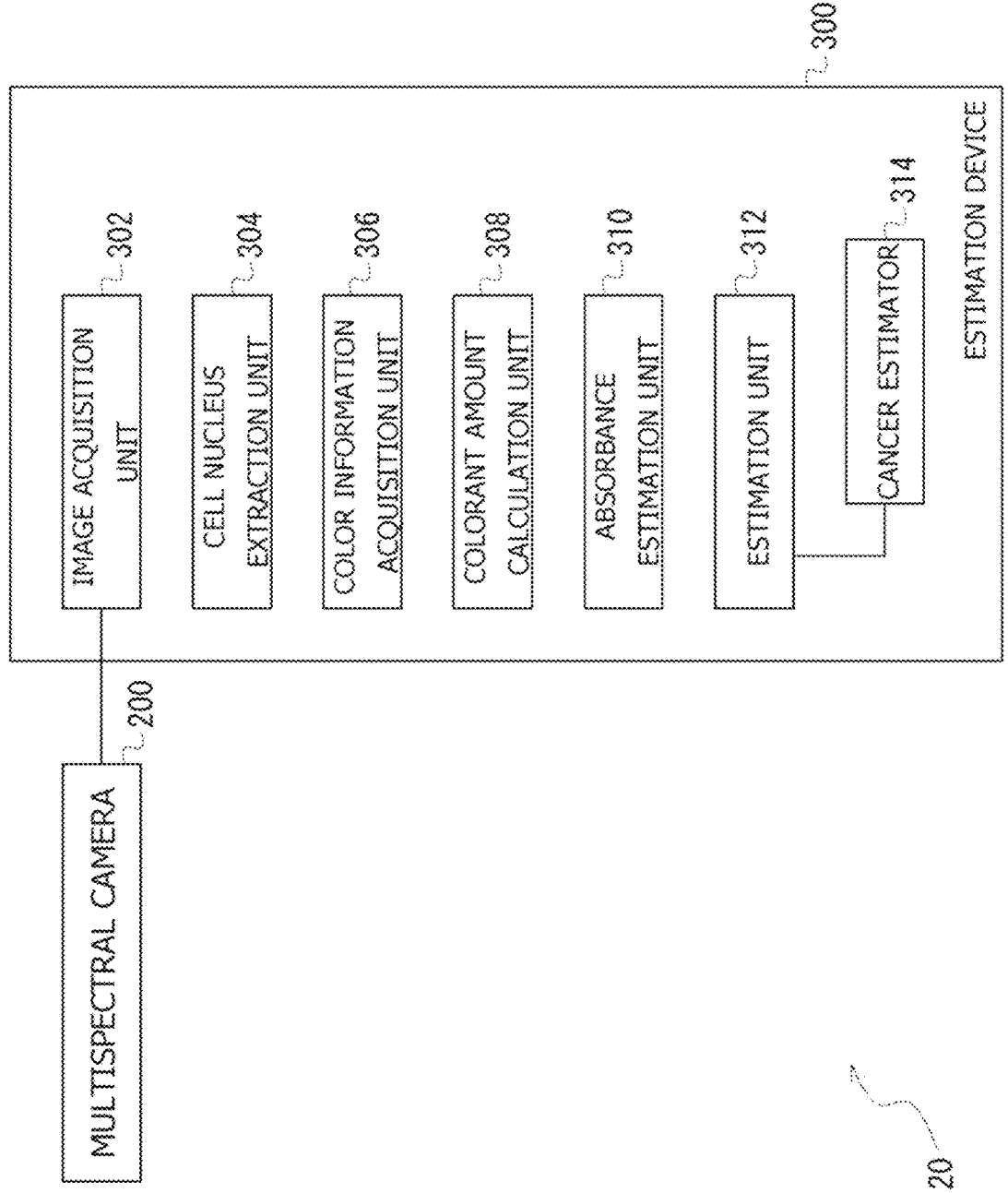
FIG. 2 is a diagram that shows an example of the configuration of a cancer estimation system according to an embodiment.

FIG. 2 is a diagram that shows an example of the configuration of a cancer estimation system according to the present embodiment. The cancer estimation system 20 according to the present embodiment contains a hyperspectral camera 200 and an estimation device 300. The estimation device 300 contains an image acquisition unit 302, a cell nucleus extraction unit 304, a color information acquisition unit 306, a colorant amount calculation unit 308, an absorbance estimation unit 310, an estimation unit 312, and an estimator 314. The hyperspectral camera 200 is the same as the hyperspectral camera 200 of FIG. 1. The estimation device 300 and the hyperspectral camera 200 are communicably connected either directly or via, for example, a network.

The estimation device 300 acquires stained sample images for each band from the hyperspectral camera 200. The estimation device 300 extracts the cell nucleus regions from the stained images, determines the absorbance of the cell nuclei, and estimates the amount of colorant. The estimation device 300 estimates the absorbance from the estimated amount of colorant and the spectral absorption coefficient. Using the absorbance and estimated amount of colorant based on the stained images and the estimator trained by the estimator learning device 100, the estimation device 300 carries out an estimation of whether the cell nuclei in the stained image are cancerous (or noncancerous). The sample is, for example, a biomaterial such as cells or tissue. The programs, data, tables, and so forth used by the estimation device 300 are stored in a storage means for the estimation device 300.

The image acquisition unit 302, image acquisition unit 302, cell nucleus extraction unit 304, color information acquisition unit 306, colorant amount calculation unit 308, and absorbance estimation unit 310 are the same as the image acquisition unit 102, cell nucleus extraction unit 104, color information acquisition unit 106, colorant amount calculation unit 108, and absorbance estimation unit 110 of FIG. 1.

Based on, inter alia, the stained image absorbance, the estimation unit 312 performs an estimation of whether the cell nuclei in the stained images are cancerous using the cancer estimator 314 that has been trained by the estimator learning device 100.

The cancer estimator 314 is in each instance a cancer estimator that has been constructed by the estimator learning device 100.

The estimator learning device 100, which carries out training of the cancer estimator, and the estimation device 300, which carries out cancer estimation, may be integrated to operate as a single device.

Figure 3:
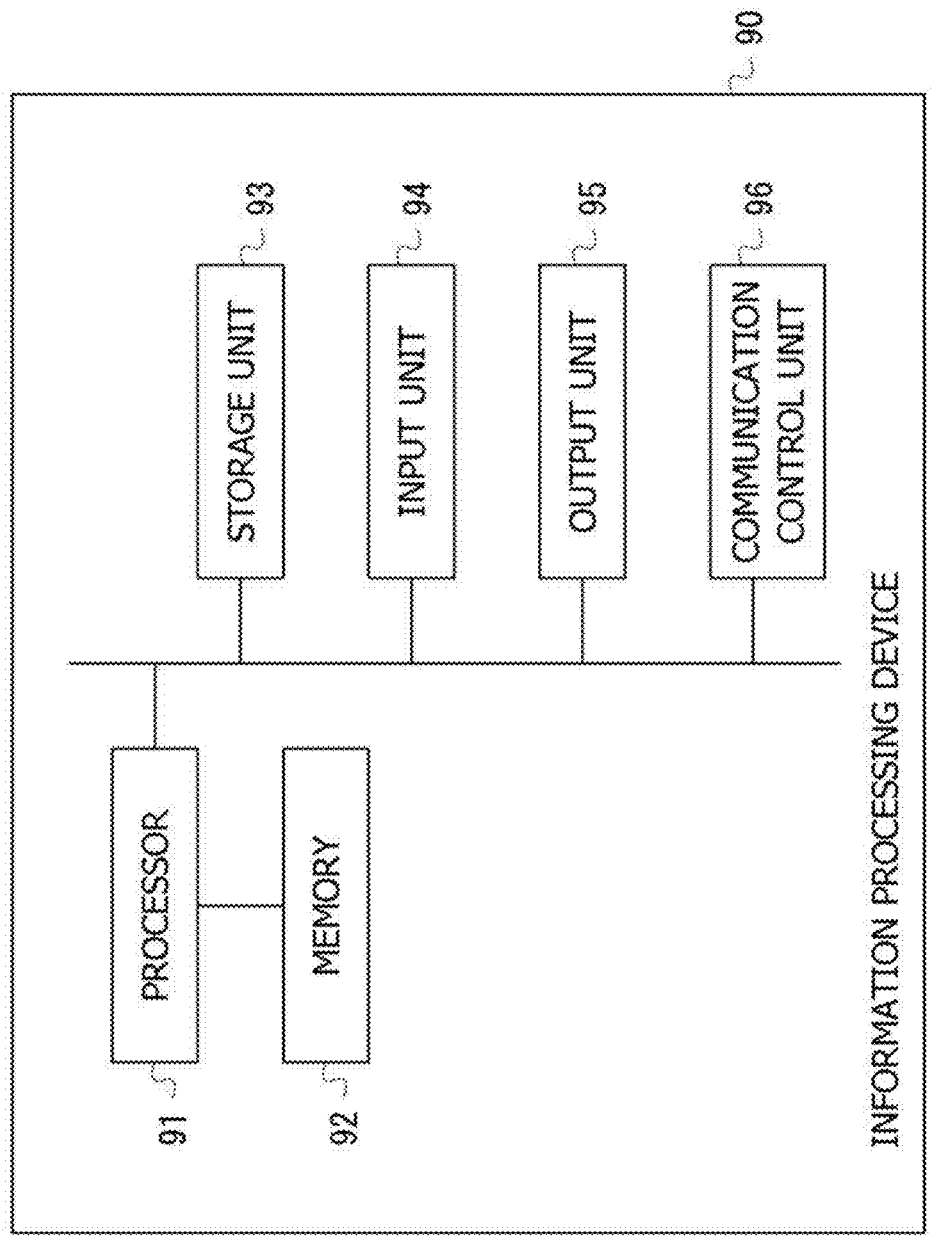
FIG. 3 is a diagram that shows an example of the hardware configuration of an information processing device.

FIG. 3 is a diagram that shows an example of the hardware configuration of an information processing device. The information processing device 90 shown in FIG. 3 has the configuration of an ordinary computer. The estimator learning device 100 is implemented by the use of an information processing device 90 as shown in FIG. 3. The information processing device 90 in FIG. 3 has a processor 91, memory 92, storage unit 93, input unit 94, output unit 95, and communication control unit 96. These are interconnected by a bus. The memory 92 and storage unit 93 are computer-readable recording media. The hardware configuration of the information processing device is not limited to the example shown in FIG. 3, and the elements in the configuration may be omitted, replaced, and expanded as appropriate.

The processor 91 in the information processing device 90 loads a program stored by the recording medium into the working space of the memory 92 and executes the program, and operations conforming to prescribed objectives can be implemented by control of, inter alia, the individual units of the configuration as execution of the program proceeds.

The processor 91 is, for example, a central processing unit (CPU) or digital signal processor (DSP).

The memory 92 includes, for example, random access memory (RAM) and read only memory (ROM). The memory 92 is also referred to as main memory.

The storage unit 93 is, for example, erasable programmable ROM (EPROM) or a hard disk drive (HDD). The storage unit 93 can include removable media, i.e., portable recording media. The removable media is, for example, a universal serial bus (USB) memory or a disk recording medium such as a compact disc (CD) or digital versatile disc (DVD). The storage unit 93 is also referred to as a secondary storage device.

The storage unit 93 stores, in a fully readable/writable form, the various programs, various data, and various tables used by the information processing device 90. The operating system (OS), various programs, various tables, and so forth are stored on the storage unit 93. Information stored by the storage unit 93 may be stored in the memory 92. In addition, information stored in the memory 92 may be stored by the storage unit 93.

The operating system is software that mediates between software and hardware and carries out memory space management, file management, process and task management, and so forth. The operating system includes a communication interface. The communication interface is a program that carries out data exchange with, e.g., other external devices that are connected via the communication control unit 96. The external devices include, for example, other information processing devices, external storage devices, and so forth.

The input unit 94 includes, for example, keyboards, pointing devices, wireless remote controls, touch panels, and so forth. The input unit 94 can include input devices for videos and images, such as cameras, and sound input devices such as microphones.

The output unit 95 includes output devices such as printers and display devices such as liquid crystal displays (LCDs), electroluminescence (EL) panels, cathode ray tube (CRT) displays, and plasma display panels (PDPs). The output unit 95 can include sound output devices such as speakers.

The communication control unit 96 is connected with other devices and controls communications between the information processing device 90 and the other devices. The communication control unit 96 is, for example, a local area network (LAN) interface board, a wireless communication circuit for wireless communication, or a communication circuit for wired communication. The LAN interface board and wireless circuit board are connected to a network, e.g., an internet.

The processor in the information processing device 90 executably deploys programs stored in an auxiliary storage unit to the working space of the main memory unit, proceeds with the execution of a program, and carries out control of peripheral devices and so forth. The information processing device can realize operations conforming to prescribed objectives as a result. The main memory unit and auxiliary storage unit are recording media readable by the information processing device.

Operating Examples

<Cancer Estimator Training>

Figure 4:
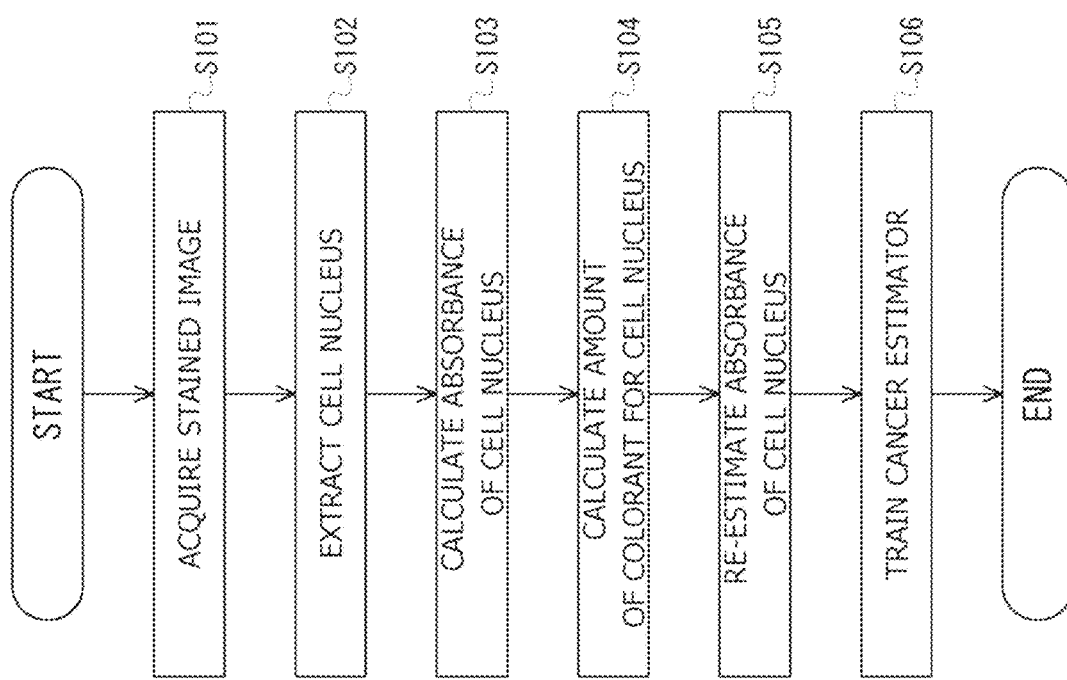
FIG. 4 is a diagram that shows an example of an operating flow for the training of a cancer estimator with an estimator learning device.

FIG. 4 is a diagram that shows an example of an operating flow for the training of a cancer estimator with the estimator learning device.

In S101, the image acquisition unit 102 acquires, from the hyperspectral camera 200, a stained image of the stained sample that has been photographed by the hyperspectral camera 200. The image acquisition unit 102 stores the acquired stained image in a storage means. The sample is, for example, a sectioned specimen from a biological material such as cells or tissue. The stained image is provided by staining the sample with a prescribed staining solution and photographing the sample. Prescribed regions are colored by the addition of the prescribed staining solution to the sample. The colored regions and the color depend on the staining solution. The stained image is photographed in a plurality of bands (frequency bands) by the hyperspectral camera 200. The staining solution is, for example, hematoxylin or eosin. A plurality of staining solutions may be used for the staining solution. The use of the hyperspectral camera 200 enables the acquisition of more detailed information for the transmitted light penetrating through the sample. Whether the cells contained in the stained image photographed by the hyperspectral camera 200 are cancerous or noncancerous is already known. Each stained image is associated with cancerous or noncancerous and stored in a storage means.

In S102, the cell nucleus extraction unit 104 extracts the cell nucleus regions in the stained image by selection, for example, by a user, of the cell nucleus regions in the stained sample image acquired in S101. The cell nucleus extraction unit 104 extracts the cell nucleus regions in the stained image by displaying the stained image with a display means, e.g., a display, and inputting (selecting) the cell nucleus regions in the stained image using an input means, for example, a pointing device, operated by, for example, a user. The cell nucleus extraction unit 104 may extract the cell nucleus regions from the stained image using, for example, image recognition technology. The cell nucleus extraction unit 104 stores the cell nucleus regions and the stained image in a storage means.

Figure 5:
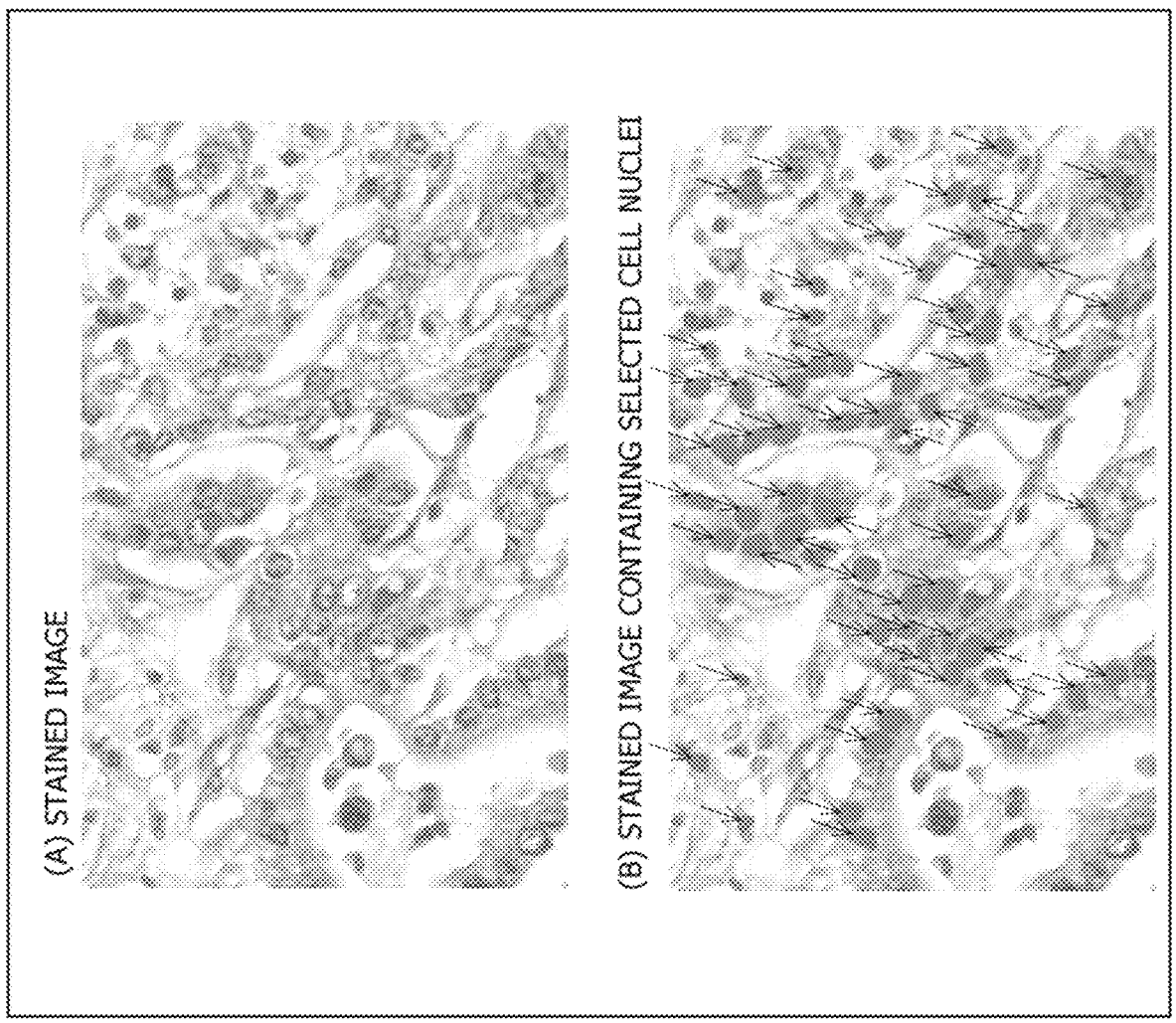
FIG. 5 is a diagram that shows an example of the selected cell nuclei in a stained image.

FIG. 5 is a diagram that shows an example of the selected cell nuclei in a stained image. FIG. 5(A) is an example of a stained image provided by the staining with a staining solution of a sectioned specimen from a biological material such as cells or tissue. FIG. 5(B) is an example of a stained image that contains selected cell nucleus regions. FIG. 5(B) shows cell nucleus regions selected from the stained image of FIG. 5(A). The grey regions indicated by the individual arrows in FIG. 5(B) are regions that have been selected as cell nucleus regions.

In S103, the color information acquisition unit 106 determines, from the extracted cell nucleus regions of the stained image for each band, the absorbance of each pixel (location) in the cell nuclei in the stained image for each band. The cell nucleus pixels used here may be a prescribed number of pixels rather than all the pixels contained in the cell nucleus regions extracted in S102. The absorbance is a quantity that shows the extent of attenuation in the intensity of light when light is passed through a medium. The absorbance of a particular pixel depends on the brightness of the particular pixel. The color information acquisition unit 106 determines, for each band, the absorbance of each particular pixel from the brightness of each particular pixel in the stained image. The absorbance in each band depends on, inter alia, the amount of colorant from the staining solution incorporated into the sample and the spectral absorption coefficient of the staining solution.

In S104, the colorant amount calculation unit 108 calculates, for each pixel, the amount of colorant from the staining solution incorporated in the sample; the calculation is performed based on the absorbance determined in S103 and the already known spectral absorption coefficient of the staining solution. The spectral absorption coefficient is a value that shows the extent to which a medium absorbs light when light is incident on the medium. The spectral absorption coefficient of a staining solution depends on the wavelength of the incident light. It is expressed as follows by the Lambert-Beer law where a is the absorbance vector, X is the spectral absorption coefficient matrix, C is the amount of colorant, and e is a difference vector. The absorbance vector a is the vector representation of the absorbance for each band. The spectral absorption coefficient matrix X is the matrix representation of the absorption coefficient for each band for each staining solution. The spectral absorption coefficient matrix X is stored in advance in a storage means. The difference vector e is a vector (residual component) where the absorbance vector a cannot be represented by the combination of the spectral absorption coefficient X and the amount of colorant C. The colorant amount calculation unit 108 calculates the estimated colorant amount C', where the difference vector e assumes a minimum, using least squares estimation.

$$a = XC + e$$

$$X^+ = (X^T X)^{-1} X^T \quad \text{[Math. 1]}$$

The colorant amount calculation unit 108 can determine the estimated colorant amount C' for each pixel (each location) for each staining solution incorporated in the sample, by multiplying the estimation matrix $X^+$ by the absorbance vector a, as shown below. $X^T$ is the transposition matrix of X.

$$C' = X^+ a \quad \text{[Math. 2]}$$

In S105, the absorbance estimation unit 110 can determine the estimated absorbance vector a' by multiplying, as shown below, absorption the spectral coefficient X by the estimated colorant amount C' determined in S104. The absorbance vector a' is the absorbance vector (estimated absorbance) estimated using the spectral absorption coefficient X of the staining solution and the estimated colorant amount C' for the staining solution incorporated in the sample.

$$a' = XC' \quad \text{[Math. 3]}$$

The difference vector e is given by the following based on the absorbance vector a calculated in S103 and the instant estimated absorbance vector a'.

$$e = a - a' \quad \text{[Math. 4]}$$

In S106, the estimator learning unit 112 analyzes, for example, by machine learning, the relationship among the absorbance vector a calculated in S103 for the cell nuclei in the stained image, the absorbance vector a' (difference vector e) estimated in S105 for the cell nuclei in the stained image, and the information on whether the cell nuclei contained in the stained image are cancerous or noncancerous. This analysis can use, for example, neural network-based deep learning, Regression SVM, Regression Random Forest, multiple regression analysis, or a learning space such as a Look Up Table. Other deep learning techniques may also be used for the analysis. The input data for the estimator learning unit 112 is, for example, the absorbance vector a and difference vector e for the stained image, and the output data is, for example, the cancerous-or-noncancerous information for the cell nuclei in the stained image. When the input data is the absorbance vector a and difference vector e, the estimator learning unit 112 may normalize each of these. The estimator learning unit 112 can carry out normalization by dividing the absorbance vector by, for example, the absorbance at 540 nm, which is the peak wavelength for eosin. The estimator learning unit 112 trains the cancer estimator by supervised learning in which the aforementioned input data and output data are associated. The cancer estimator is optimized by using a larger number of combinations of the absorbance vector a+difference vector e with the cancerous-or-noncancerous cell nuclei information. In addition, the cancer estimator can be trained for each individual staining solution. The estimator learning unit 112 may train the cancer estimator using cancerous-or-noncancerous cell nuclei information and any one of the absorbance vector a, absorbance vector a', and difference vector e. The cancer estimator is stored in a storage means. Vector normalization can be carried out, for example, by dividing the vector by the value at which the absolute value of the vector components is the largest, and using this as the new vector (normalized vector).

In addition, the estimator learning device 100 can train a cancer estimator for various staining solutions by carrying out cancer estimator training using stained images provided by staining samples with various staining solutions.

<Examples of Modifications in Cancer Estimator Training>

Strongly colored pixels (low transmittance, high absorbance) and weakly colored pixels (high transmittance, low absorbance) are present in the cell nuclei in the stained image. The strongly colored/weakly colored pixels also include strongly colored/weakly colored pixels from eosin staining and strongly colored/weakly colored pixels from hematoxylin staining. The cancer estimator is trained in the preceding example without dividing the cell nucleus transmittance into high regions and low regions (high-absorbance regions and low-absorbance regions). Hypothesizing that the properties are different between a region where the cell nucleus transmittance is high and a region where it is low (high-absorbance region and low-absorbance region), training is therefore performed in the present case by carrying out partitioning. The absorbance is the logarithm of the reciprocal of the transmittance (absorbance=-log (transmittance)). The absorbance monotonically declines when the transmittance increases. The transmittance may be used in place of the absorbance.

Pixels in the cell nucleus regions of the stained image for which the maximum value of the absorbance at 515 nm to 565 nm, which are the wavelengths of the color from eosin staining, is at least a threshold value (the minimum value of the transmittance is not more than a threshold value) are extracted by the estimator learning unit 112 as eosin dark pixels. In addition, pixels in the cell nucleus regions of the stained image for which the maximum value of the absorbance at 515 nm to 565 nm, which are the wavelengths of the color from eosin staining, is less than a threshold value (the minimum value of the transmittance exceeds a threshold value) are extracted by the estimator learning unit 112 as eosin light pixels. The estimator learning unit 112 sorts the cell nucleus regions of the stained image into eosin dark pixels and eosin light pixels and carries out cancer estimator training with each.

The estimator learning unit 112 varies the threshold value for the maximum value of the transmittance at wavelengths of 515 nm to 565 nm, which divides eosin dark pixels from eosin light pixels, for example, in 0.05 steps from 0.15 to 0.40, and carries out cancer estimator training for each. The estimator learning unit 112 calculates the accuracy for the cancer estimator for each threshold value. The threshold value that provides the highest accuracy is used by the estimator learning unit 112 as the threshold value for the maximum value of the absorbance at wavelengths of 515 nm to 565 nm, which divides eosin dark pixels from eosin light pixels.

The estimator learning unit 112 may also carry out sorting using hematoxylin-based differences in absorbance (transmittance). In this case, pixels in the cell nucleus regions of the stained image for which the maximum value of the absorbance at 585 nm to 635 nm, which are the wavelengths of the color from hematoxylin staining, is at least a threshold value (the minimum value of the transmittance is not more than a threshold value) are extracted by the estimator learning unit 112 as hematoxylin dark pixels. In addition, pixels in the cell nucleus regions of the stained image for which the maximum value of the absorbance at 585 nm to 635 nm, which are the wavelengths of the color from hematoxylin staining, is less than a threshold value (the minimum value of the transmittance exceeds a threshold value) are extracted by the estimator learning unit 112 as hematoxylin light pixels. The estimator learning unit 112 sorts the cell nucleus regions of the stained image into hematoxylin dark pixels and hematoxylin light pixels and carries out cancer estimator training for each.

The estimator learning unit 112 varies the threshold value for the maximum value of the transmittance at wavelengths of 585 nm to 635 nm, which divides hematoxylin dark pixels from hematoxylin light pixels, for example, in 0.05 steps from 0.30 to 0.70, and carries out cancer estimator training for each. The estimator learning unit 112 calculates the accuracy for the cancer estimator for each threshold value. The threshold value that provides the highest accuracy is used by the estimator learning unit 112 as the threshold value for the maximum value of the absorbance at wavelengths of 585 nm to 635 nm, which divides hematoxylin dark pixels from hematoxylin light pixels.

Figure 6:
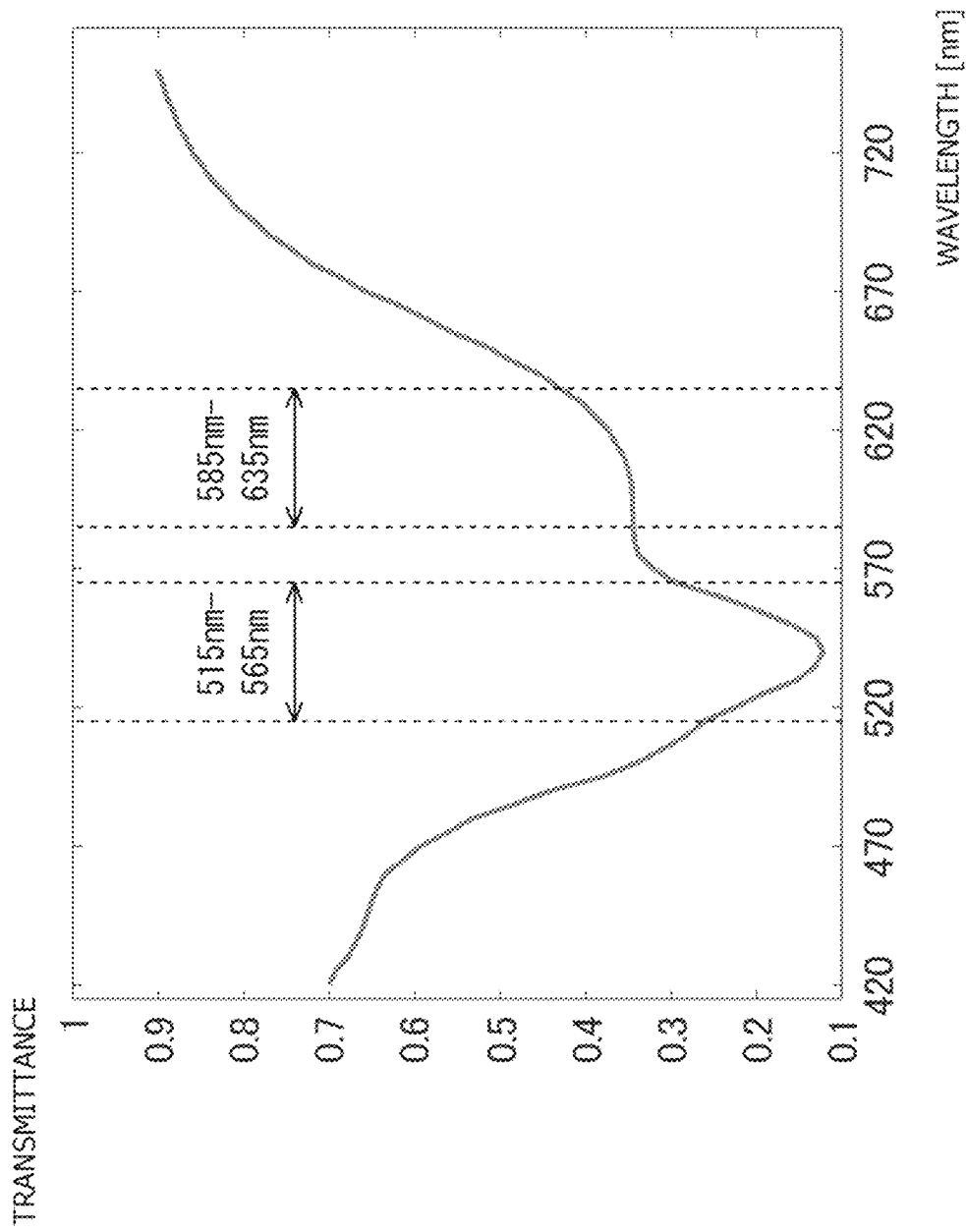
FIG. 6 is a diagram that shows an example of a graph of the wavelength dependence of the transmittance for a cell nucleus region of a stained image.

FIG. 6 is a diagram that shows an example of a graph of the wavelength dependence of the transmittance for a cell nucleus region of a stained image. The horizontal axis for the graph in FIG. 6 is the light wavelength, and the vertical axis is the light transmittance. In the graph in FIG. 6, the transmittance assumes a minimum value at 540 nm in the region from 515 nm to 565 nm, which are the wavelengths of the color from eosin staining. The transmittance in the graph in FIG. 6 also assumes a minimum value at 585 nm in the region from 515 nm to 565 nm, which are the wavelengths of the color from hematoxylin staining.

The estimator learning unit 112 may also carry out sorting using the ratio between the absorbance from eosin and the absorbance from hematoxylin. Here, sorting is performed using the density of the color from the hematoxylin-based staining with reference to the density of the color from the eosin-based staining. That is, sorting is carried out based on whether the color due to hematoxylin staining is relatively darker or lighter versus the color due to eosin staining. In this case, the estimator learning unit 112 extracts, as relatively hematoxylin dark pixels, those pixels in the cell nucleus regions of the stained image for which the maximum value at 585 nm to 635 nm—which are the wavelengths of the color for hematoxylin-based staining—of the values (REH: ratio of eosin to hematoxylin) provided by dividing the absorbance by the absorbance at 540 nm, which is the peak wavelength for eosin, is at least a threshold value. The estimator learning unit 112 also extracts, as relatively hematoxylin light pixels, those pixels in the cell nucleus regions of the stained image for which the maximum value of REH at 585 nm to 635 nm—which are the wavelengths of the color for hematoxylin-based staining—is less than a threshold value. The estimator learning unit 112 sorts the cell nucleus regions of the stained image into relatively hematoxylin dark pixels and relatively hematoxylin light pixels and carries out cancer estimator training with each. An example of normalization of the absorbance is the division of the absorbance by the absorbance at 540 nm, which is the peak wavelength for eosin.

Figure 7:
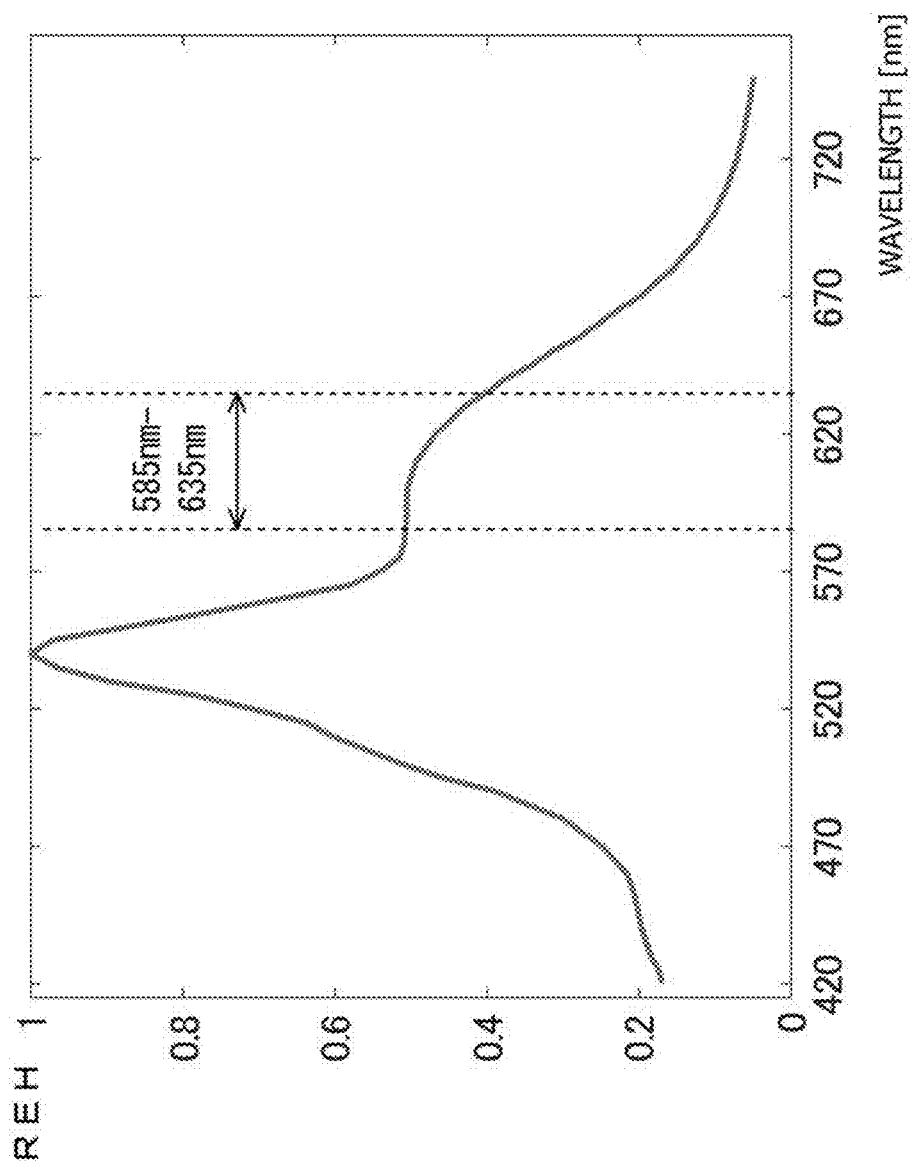
FIG. 7 is a diagram that shows an example of a graph of the wavelength dependence of REH in the cell nucleus regions of a stained image.

FIG. 7 is a diagram that shows an example of a graph of the wavelength dependence of REH in the cell nucleus regions of the stained image. The horizontal axis in FIG. 7 is wavelength and the vertical axis is REH. REH is calculated by dividing the absorbance by the absorbance at 540 nm, which is the peak wavelength for eosin. Thus, REH becomes 1 at a wavelength of 540 nm. In addition, the maximum value of REH at 585 nm to 635 nm—which are the wavelengths of the color from hematoxylin-based staining—is 0.50 at a wavelength of 585 nm in the graph in FIG. 7.

The estimator learning unit 112 varies the threshold value for the maximum value of REH at wavelengths of 585 nm to 635 nm, which divides relatively dark pixels and relatively light pixels for the color of hematoxylin-induced staining relative to the color of eosin-based staining, for example, in 0.05 steps from 0.40 to 0.70, and carries out cancer estimator training for each. The estimator learning unit 112 calculates the accuracy for the cancer estimator for each threshold value. The threshold value that provides the highest accuracy is used by the estimator learning unit 112 as the threshold value for the maximum value of the absorbance at wavelengths of 585 nm to 635 nm, which divides hematoxylin dark pixels from hematoxylin light pixels.

Of the cancer estimators based on classification using eosin transmittance, classification using hematoxylin transmittance, and classification using the absorbance ratio between eosin and hematoxylin (REH), the cancer estimator with the highest accuracy is used by the estimator learning unit 112 as the cancer estimator.

The cancer estimator performance can be further enhanced by classification of the stained image using the REH difference or the eosin or hematoxylin transmittance (absorbance) of the cell nuclei. While a cancer estimator has been considered here, diseases and events other than cancer may be considered. The cancer estimator is an example of an estimator.

<Cancer Estimation>

Figure 8:
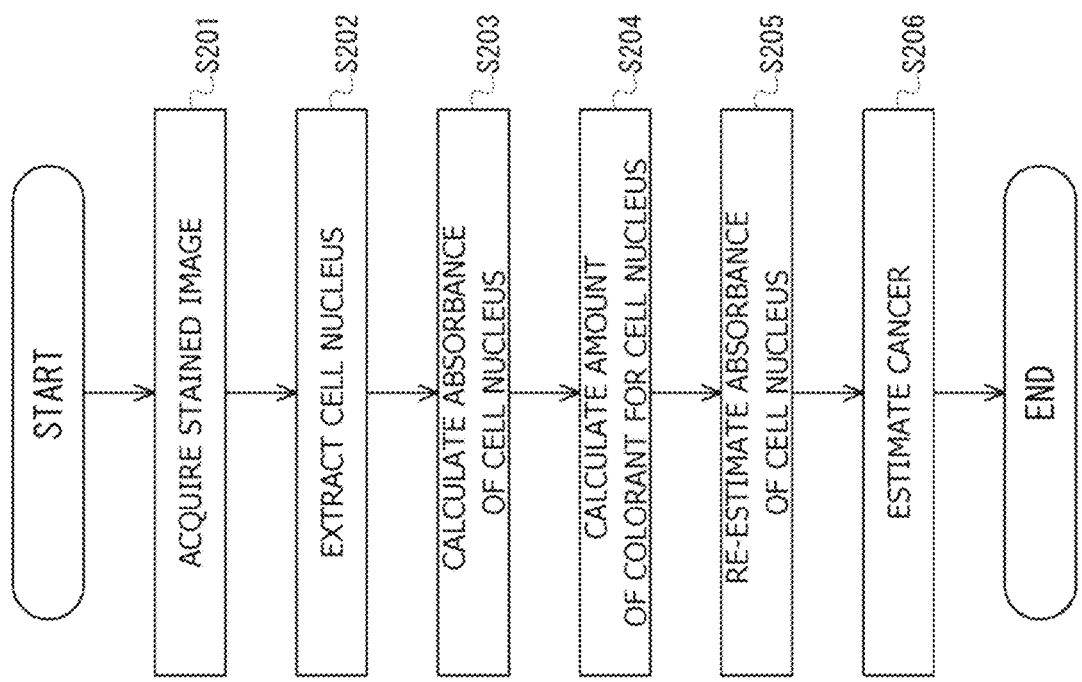
FIG. 8 is a diagram that shows an example of the operational flow during cancer estimation with an estimation device.

FIG. 8 is a diagram that shows an example of the operational flow during cancer estimation with an estimation device. Here, the estimation device 300 carries out cancer estimation using the cancer estimator described above and a stained image provided by staining cells that are the target for cancer estimation.

In S201, an image acquisition unit 302 acquires, from a hyperspectral camera 200, a stained image of a stained sample photographed by the hyperspectral camera 200. The image acquisition unit 302 stores the acquired stained image in a storage means. The sample is a sectioned specimen from biological material, e.g., cells, tissue, and so forth, that is the target for cancer estimation. The stained image is provided by staining the sample with a prescribed staining solution and photographing the sample. Prescribed regions are colored by the addition of the prescribed staining solution to the sample. The color and the regions that undergo coloration are dependent on the staining solution. The stained image is photographed in a plurality of bands (frequency bands) by the hyperspectral camera 200. The staining solution is, for example, hematoxylin or eosin. A plurality of staining solutions may be used for the staining solution. More detailed information with regard to the transmitted light transmitted through the sample can be obtained through the use of the hyperspectral camera 200.

S202 to S205 are the same as S102 to S105 in FIG. 4.

In S206, an estimation unit 312 carries out the estimation of cancerous/noncancerous using a cancer estimator 314 and using, for example, the following as input data: the absorbance vector a for the cell nuclei in the stained image, as calculated in S203, and the absorbance vector a' (difference vector e) of the cell nuclei of the stained image, as estimated in S205. Here, the estimation unit 312 carries out estimation of cancerous/noncancerous by using a cancer estimator 314 that has been trained by the estimator learning device 100. The estimation unit 312 stores the results of the cancerous/noncancerous estimation on a storage means, e.g., a storage device, and/or outputs the results of the cancerous/noncancerous estimation on a display means, e.g., a display. The elements of the input data (e.g., absorbance vector, difference vector, and so forth) are the same as the elements of the input data during training of the cancer estimator 314.

As a consequence of the preceding, the estimation device 300 can carry out cancer estimation using a stained image that contains cell nuclei that are the target of the cancer estimation and using the cancer estimator 314 trained by the estimator learning device 100.

(Cancer Estimation Performance by Cancer Estimator)

The performance of the estimator learning device 100-trained cancer estimator is considered here using stained images of sections of noncancerous tissue and stained images of sections of cancerous tissue. The sections from each type of tissue were preliminarily determined to be cancerous or noncancerous by a pathologist. The performance of the cancer estimator, similarly trained with the estimator learning device 100, is also considered using, as a comparative target, stained images photographed with an RGB camera rather than the hyperspectral camera 200. A stained image in the band containing the color red, a stained image in the band containing the color green, and a stained image in the band containing the color blue were obtained with the RGB camera. For the case of the use of stained images photographed with the RGB camera, the accuracy of the cancer estimator was 79.8%, the sensitivity was 82.8%, and the specificity was 74.2%. The sensitivity is the probability that a cancer cell is estimated to be cancerous. The specificity is the probability of estimating a noncancerous cell as noncancerous. The accuracy is the probability that cells determined to be cancerous are cancer cells.

When the cancer estimator was trained with the estimator learning device 100 using a non-normalized absorbance vector a, the accuracy of the cancer estimator was 83.3%, the sensitivity was 88.4%, and the specificity was 74.0%. Stained images photographed with the hyperspectral camera 200 are used in this case. The cancer estimator performance is generally improved using the hyperspectral camera 200 in comparison to the use of the RGB camera.

When the cancer estimator was trained with the estimator learning device 100 using the normalized absorbance vector a and the normalized difference vector e, the accuracy of the cancer estimator was 89.9%, the sensitivity was 90.2%, and the specificity was 89.2%. The cancer estimator performance is improved using the normalized absorbance vector a and normalized difference vector e in comparison to the use of the non-normalized absorbance vector a.

Cancer estimator training was performed with the estimator learning device 100 using the normalized absorbance vector a and normalized difference vector e and carrying out classification while varying the threshold value for eosin transmittance in 0.05 steps from 0.15 to 0.40. When this was done, the accuracy of the overall cancer estimators including the dark case and light case was highest, at 91%, when the threshold value was 0.20. In addition, cancer estimator training was performed with the estimator learning device 100 using the normalized absorbance vector a and normalized difference vector e and carrying out classification while varying the threshold value for hematoxylin transmittance in 0.05 steps from 0.30 to 0.70. When this was done, the accuracy of the overall cancer estimators including the dark case and light case was highest, at 90%, when the threshold value was 0.45. Cancer estimator training was also performed with the estimator learning device 100 using the normalized absorbance vector a and normalized difference vector e and carrying out classification while varying the REH threshold value in 0.05 steps from 0.40 to 0.70. When this was done, the accuracy for all the cancer estimators including the dark case and light case was highest, at 88%, when the threshold value was 0.70. Thus, the result for the accuracy was highest, at 91%, when cancer estimator training was performed with the estimator learning device 100 using the normalized absorbance vector a and normalized difference vector e and carrying out classification using 0.20 for the threshold value for eosin transmittance.

Cancer estimator training was performed with the estimator learning device 100 using the normalized absorbance vector a and normalized difference vector e and carrying out classification using a threshold value for eosin transmittance. 0.20 (20%) was used for the threshold value for eosin transmittance. The accuracy of the cancer estimator for the case in which the eosin transmittance was not more than the threshold value (the dark case) was 92.1%, and the sensitivity was 91.7% and the specificity was 92.5%. The accuracy of the cancer estimator for the case in which the eosin transmittance exceeded the threshold value (the light case) was 90.0%, and the sensitivity was 91.2% and the specificity was 86.4%. In addition, the accuracy for all the cancer estimators including the case of not more than the threshold value and the case of exceeding the threshold value was 90.9%, while the sensitivity was 91.4% and the specificity was 89.9%. By carrying out classification using a threshold value for eosin transmittance, the cancer estimator performance is improved, both for the dark case and the light case, over the absence of classification.

(Other)

The preceding has concerned the performance of cancer estimators trained by the estimator learning device 100 using stained images of noncancerous tissue sections and stained images of cancerous tissue sections. The noncancerous tissue sections and the cancerous tissue sections are sections acquired from different subjects. As a consequence, differences in coloration may exist, due to the influence of differences between subjects, between noncancerous tissue sections from a subject A and cancerous tissue sections from a subject B. The performance of an estimator learning device 100-trained cancer estimator is presented here using positive cell nuclei (proliferating cell nuclei) and negative cell nuclei (normal cell nuclei, cell nuclei other than the positive nuclei) in the same tissue in the same section. HE-stained images and MIB1-stained images are used here. The HE-stained images are images provided by staining the sections with hematoxylin and eosin staining solutions and then photographing the sections. HE-stained images photographed in 51 bands with the hyperspectral camera 200 are used in the present case. The MIB1-stained images are stained images provided by staining Ki-67 with MIB-1 antibody in immunostaining, where cell nuclei assuming a brown color are taken to be positive cell nuclei and cell nuclei assuming a blue color are taken to be negative cell nuclei. In the present case, positive cell nuclei (Ki-67-positive nuclei) are tentatively presumed to be cancer cells. The estimator learning device 100 trains the cancer estimator using the following set: the absorbance vector a and difference vector e of the individual cell nuclei in the HE-stained image photographed in 51 bands, and the positive cell nucleus-or-negative cell nucleus information for each cell nucleus from the MIB1-stained image. Feature selected was performed in the present case by the forward stepwise method using a Support Vector Machine. The cancer estimator had an accuracy of positive cell nucleus estimation of 65%. The accuracy of positive cell nucleus estimation is the probability that a cell nucleus estimated to be a positive cell nucleus is a positive cell nucleus.

For comparison, the accuracy of positive cell nucleus estimation by the cancer estimator was 63% for a cancer estimator trained using the following set: the absorbance vector a of the cell nuclei in the HE-stained image photographed in 51 bands, and the positive cell nucleus-or-negative cell nucleus information for each cell nucleus from the MIB1-stained image. In addition, the accuracy of positive cell nucleus estimation by the cancer estimator was 61% for a cancer estimator trained using the following set: the absorbance vector a of the cell nuclei in the HE-stained image photographed in 17 bands, and the positive cell nucleus-or-negative cell nucleus information for each cell nucleus from the MIB1-stained image. It is thus shown that the estimation accuracy is enhanced by training the cancer estimator using the difference vector e.

Functions and Effects of Embodiments

The estimator learning device 100 acquires stained images that contain cell nuclei stained with a staining solution and photographed in individual bands using the hyperspectral camera 200. A large number of stained image bands can be obtained through the use of the hyperspectral camera 200. The estimator learning device 100 extracts the cell nucleus regions in a stained image by, for example, performing selection, for example, by a user, of the cell nucleus regions in the acquired stained image of the sample. Operating on the extracted cell nucleus regions in each stained image band, the estimator learning device 100 determines the absorbance of each pixel (position) in the cell nuclei in the stained image. Based on the absorbance and the already known spectral absorption coefficient of the staining solution, the estimator learning device 100 calculates for each pixel the colorant amount from the staining solution incorporated by the sample. In addition, the estimator learning device 100 estimates the absorbance vector based on the calculated colorant amount and the spectral absorption coefficient X of the staining solution. The estimator learning device 100 calculates a difference vector that is the difference between the absorbance vector determined from the stained image and the estimated absorbance vector. The estimator learning device 100 analyzes, for example, by machine learning, the relationship among the absorbance vector a for the cell nuclei in the stained image, the difference vector e that is the difference between the absorbance vector and the estimated absorbance vector a' for the cell nuclei in the stained image, and information on whether the cell nuclei contained in the stained image are cancerous or noncancerous, and trains a cancer estimator. The cancer estimator can estimate, based on, for example, the absorbance vector of the cell nuclei in a stained image, whether the cell nuclei are cancerous or noncancerous. The estimator learning device 100 can construct a cancer estimator with a higher performance by using a greater number of stained image bands. The estimator learning device 100 can calculate the difference vector e based on the Lambert-Beer law. The estimator learning device 100 can construct a cancer estimator with a higher performance by training the cancer estimator using the difference vector e.

The estimation device 300 estimates whether the cell nuclei in a stained image are cancerous or noncancerous based on a cancer estimator 314 trained by the estimator learning device 100 and based on stained images containing cell nuclei stained by a staining solution and photographed in each band with the hyperspectral camera 200.

<Computer-Readable Recording Media>

A program that can implement any of the aforementioned functions on a computer or other machine or device (referred to as a "computer and so forth" in the following) can be recorded on a recording medium that can be read by a computer and so forth. The function can then be provided by having a computer and so forth read in the program on this recording medium and execute same.

The recording medium readable by a computer and so forth denotes a recording medium that can store information, e.g., data, programs, and so forth, by an electrical, magnetic, optical, mechanical, or chemical action, and that can be read from a computer and so forth. Elements that compose a computer, e.g., a CPU, memory, and so forth, may be disposed in this recording medium and a program may be executed by this CPU.

Of such recording media, recording media removable from the computer and so forth can be exemplified by flexible disks, magneto-optical disks, CD-ROMs, CD-R/Ws, DVDs, DATs, 8-mm tapes, memory cards, and so forth.

Recording media installed in the computer and so forth can be exemplified by hard disks, ROMs, and so forth.

(Other)

Embodiments of the present invention have been described in the preceding, but these are simply examples and the present invention is not limited to or by these. Insofar as there is no departure from the substance of the claims, various modifications based on the knowledge of the individual skilled in the art are possible, e.g., combinations of individual configurations.

REFERENCE SIGNS LIST

10 System
100 Estimator learning device
102 Image acquisition unit
104 Cell nucleus extraction unit 106 Color information acquisition unit
108 Colorant amount calculation unit
110 Absorbance estimation unit
112 Estimator learning unit
200 Hyperspectral camera
300 Estimation device
302 Image acquisition unit
304 Cell nucleus extraction unit
306 Color information acquisition unit
308 Colorant amount calculation unit
310 Absorbance estimation unit
312 Estimation unit
314 Cancer estimator
90 Information processing device
91 Processor
92 Memory
93 Storage unit
94 Input unit
95 Output unit
96 Communication control unit

What is claimed is:

1. An estimator learning device comprising:
an image acquisition unit that acquires stained images provided by photographing respectively in a plurality of wavebands a biomaterial sample that has been stained with a prescribed staining solution;
a cell nucleus extraction unit that extracts a cell nucleus region present in the biomaterial sample in each of the stained images;
a color information acquisition unit that calculates, for each of the stained images, absorbance in each of the wavebands in the cell nucleus region;
an estimator learning unit that, based on a relationship between the absorbance in each of the wavebands and information associated with the biomaterial sample and relating to whether the cell nucleus present in the biomaterial sample is in a prescribed state, trains an estimator that estimates whether the cell nucleus is in the prescribed state from the absorbance in each of the wavebands,
a colorant amount calculation unit that estimates an amount of colorant incorporated from the staining solution into the cell nucleus region, the estimation being carried out, based on a spectral absorption coefficient of the staining solution and the absorbance in each wavebands for the cell nucleus region as calculated by the color information acquisition unit; and
an absorbance estimation unit that estimates, based on the amount of colorant and the spectral absorption coefficient, an estimated absorbance for each of the wavebands that is the estimated absorbance in the cell nucleus region for each of the wavebands, wherein
the estimator learning unit, based on a relationship among the absorbance in each of the wavebands, a difference between the calculated absorbance in each of the wavebands and the estimated absorbance in each of the wavebands, and information associated with the biomaterial sample and relating to whether the cell nucleus contained in the biomaterial sample is in a prescribed state, trains the estimator that estimates, from the absorbance and the difference in each of the wavebands, whether the cell nucleus is in the prescribed state.

2. The estimator learning device according to claim 1, wherein the absorbance and difference in each of the wavebands are each normalized.

3. The estimator learning device according to claim 1, wherein the estimator learning unit trains the estimator by using one of the absorbance in a prescribed waveband, which is greater than or equal to a prescribed value, and the absorbance in a prescribed waveband, which is less than the prescribed value.

4. The estimator learning device according to claim 1, wherein whether the cell nucleus is in the prescribed state corresponds to whether the cell nucleus is cancerous or noncancerous.

5. The estimator learning device of claim 1, wherein the calculated absorption in each of the wavebands by the color information acquisition unit is based on the amount of colorant from the staining solution incorporated into the sample and the spectral absorption coefficient of the staining solution.

6. An estimator learning method executed by an estimator learning device, the method comprising:
acquiring stained images by photographing respectively in a plurality of wavebands a biomaterial sample that has been stained with a prescribed staining solution;
extracting a cell nucleus region present in the biomaterial sample in each of the stained images;
calculating, for each of the stained images, the absorbance in each of the wavebands in the cell nucleus region; and
training, based on a relationship between the absorbance in each of the wavebands and information associated with the biomaterial sample relating to whether the cell nucleus in the biomaterial sample is in a prescribed state, an estimator that estimates whether the cell nucleus is in the prescribed state from the absorbance in each of the wavebands,
estimating an amount of colorant incorporated from the staining solution into the cell nucleus region, the estimation being carried out, based on a spectral absorption coefficient of the staining solution and the absorbance in each wavebands for the cell nucleus region as calculated;
estimating, based on the amount of colorant and the spectral absorption coefficient, an estimated absorbance for each of the wavebands that is the estimated absorbance in the cell nucleus region for each of the wavebands, and
based on a relationship among the absorbance in each of the wavebands, a difference between the calculated absorbance in each of the wavebands and the estimated absorbance in each of the wavebands, and information associated with the biomaterial sample and relating to whether the cell nucleus contained in the biomaterial sample is in a prescribed state, training the estimator that estimates, from the absorbance and the difference in each of the wavebands, whether the cell nucleus is in the prescribed state.

7. A non-transitory computer readable medium storing an estimator learning program for an estimator learning device to execute:
acquiring stained images by photographing respectively in a plurality of wavebands a biomaterial sample that has been stained with a prescribed staining solution;
extracting a cell nucleus region present in the biomaterial sample in each of the stained images;
calculating, for each of the stained images, the absorbance in each of wavebands in the cell nucleus region; and
training, based on a relationship between an absorbance in each of the wavebands and information associated with the biomaterial sample and relating to whether the cell nucleus in the biomaterial sample is in a prescribed state, an estimator that estimates whether the cell nucleus is in the prescribed state from the absorbance in each of the wavebands, estimating an amount of colorant incorporated from the staining solution into the cell nucleus region, the estimation being carried out, based on a spectral absorption coefficient of the staining solution and the absorbance in each wavebands for the cell nucleus region as calculated;

estimating, based on the amount of colorant and the spectral absorption coefficient, an estimated absorbance for each of the wavebands that is the estimated absorbance in the cell nucleus region for each of the wavebands, and based on a relationship among the absorbance in each of the wavebands, a difference between the calculated absorbance in each of the wavebands and the estimated absorbance in each of the wavebands, and information associated with the biomaterial sample and relating to whether the cell nucleus contained in the biomaterial sample is in a prescribed state, training the estimator that estimates, from the absorbance and the difference in each of the wavebands, whether the cell nucleus is in the prescribed state.

* * * * *